(No Model.)
C. C. CARTER.
HAND HAY RAKE.
No. 323,788. Patented Aug. 4, 1885.
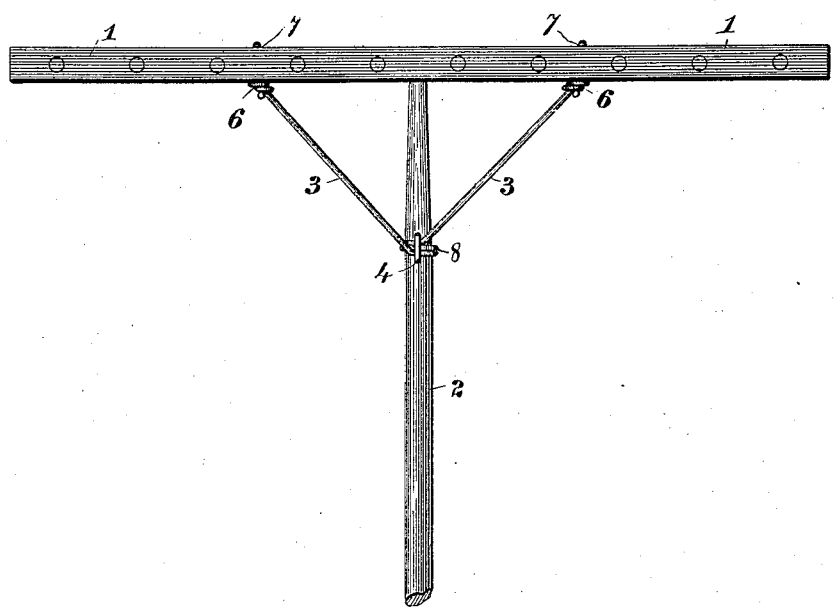
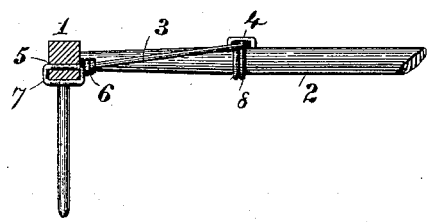
Attest:
Geo. T. Smallwood.
L. H. Hopkins.
Inventor:
Charles C. Carter,
By Knight Bros.
Attys.
N. PETERS, Photo-Lithographer, Washington, D. C.

UNITED STATES PATENT OFFICE.

CHARLES C. CARTER, OF BURTON, OHIO.

HAND HAY-RAKE.

SPECIFICATION forming part of Letters Patent No. 323,788, dated August 4, 1885.

Application filed December 15, 1884. (No model.)

*To all whom it may concern:*

Be it known that I, CHARLES C. CARTER, a citizen of the United States, residing at Burton, in the county of Geauga and State of Ohio, have invented a new and useful Improvement in Wooden Hand Hay-Rakes, of which the following is a specification.

My invention relates to those braces for wooden hand hay-rakes which are formed of wire.

My improvement consists in a peculiar form of brace and a rake-head constructed to permit the application of the brace.

In order that my invention may be more fully understood, I will proceed to describe it with reference to the accompanying drawings, in which—

Figure I is a plan view of my improved rake. Fig. II is a vertical section of the head at the point of passage of the wire.

The wooden head and handle 1 2 of the improved rake are made of ordinary construction and fitted together in ordinary manner, except that the head has perforations or holes 5 extending entirely through the head near the bottom. The brace or bow 3 is made of wire bent one or more times around the handle to form a coil, 8, and held from slipping thereon by a staple, 4. The two ends of the wire are then passed through holes 5, provided in the head, are bent down under said head and over the body of the wire to form loops 7 and end coils, as shown at 6, so as to securely fasten the wire in place and brace the rake in the proper manner.

I do not claim, broadly, a rake-head and rake-handle braced together by wire bows, as I am aware that wire bracing in such connection is not new.

Having thus described my invention, the following is what I claim as new therein and desire to secure by Letters Patent:

The combination of the rake-head 1, having holes 5, handle 2, inserted in said head, and wire brace formed with body 3, coil 8 around the handle, loops 7, passed through the holes, and end coils, 6, to lock the loops to the body.

CHARLES C. CARTER.

Witnesses:
 W. S. METCALFE,
 C. F. BURLEIGH.